(12) United States Patent
Soma

(10) Patent No.: US 6,585,595 B1
(45) Date of Patent: Jul. 1, 2003

(54) VIBRATION GENERATING DEVICE AND INPUT DEVICE FOR GAME APPARATUS USING THE SAME

(75) Inventor: Masahiro Soma, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 204 days.

(21) Appl. No.: 09/585,972

(22) Filed: Jun. 2, 2000

(30) Foreign Application Priority Data

Jun. 4, 1999 (JP) .......................................... 11-158766

(51) Int. Cl.$^7$ ................................................. A63F 9/22
(52) U.S. Cl. ...................... 463/36; 273/148 B; 345/702; 74/87; 340/7.6
(58) Field of Search .............................. 463/30, 36–38; 273/148 B; 434/45, 46, 59; 345/701, 702, 161, 163, 167; 340/7.6, 407.1; 472/56; 15/379; 74/87; 310/50, 51, 81

(56) References Cited

U.S. PATENT DOCUMENTS

| | | | | |
|---|---|---|---|---|
| 2,861,458 A | * | 11/1958 | Awedissjan | ..................... 74/87 |
| 3,598,029 A | * | 8/1971 | Paramythioti | ............... 404/117 |
| 3,911,416 A | * | 10/1975 | Feder | ......................... 340/7.6 |
| 4,121,472 A | * | 10/1978 | Vural et al. | .............. 340/407.1 |

FOREIGN PATENT DOCUMENTS

JP 2-48084 2/1990

* cited by examiner

Primary Examiner—Mark Sager
Assistant Examiner—Steven Ashburn
(74) Attorney, Agent, or Firm—Brinks Hofer Gilson & Lione

(57) ABSTRACT

Disclosed is an input device (controller) for inputting signals to a game apparatus using a computer. The input device includes a vibration generating device, the vibration state of which can be set in correspondence with the frequency.

2 Claims, 3 Drawing Sheets

VIBRATION GENERATING DEVICE AND INPUT DEVICE FOR GAME APPARATUS USING THE SAME

BACKGROUND OF THE INVENTION

1. Field of the Invention

The present invention relates to an input device for game apparatus which makes it possible to enjoy a game full of realism in real time on a screen of the game apparatus using a computer by operating an operating member such as an operating key, an operating button, or an operating lever, and to an vibration generating device suitable for use in this input apparatus.

2. Description of the Related Art

Recently, a game apparatus has rapidly become widespread in which it is possible to enjoy games on a display screen by operating an operating member such as an operating key, an operating button, or an operating lever in correspondence with a game stored in a computer apparatus beforehand or a game software input for each game (hereinafter simply referred to as a game apparatus). As the software for use in such a game apparatus, various types of software such as a role play type, speed competition type, shooting type, fight/dialogue type, and creating/rearing type software have been conceived.

For example, when storing a game software in an ordinary general use computer beforehand or inputting a game software for each game to use it as a game apparatus, a keyboard, a mouse or the like is used as the input device. In many cases, however, a dedicated game apparatus is used, so that an input device such as a dedicated controller or a joy stick separated from the game apparatus is generally used as the input device to be operated by the person playing the game.

This input device is called a controller having a so-called multiple switch, and has on the upper surface of a substantially rectangular case (or a modification thereof) a cross key, a key top, a selection key, etc., one or two or more button keys being provided on the right-hand and left-hand sides of the front surface. And, on the inner side of the upper surface of the case, there is provided a printed board provided with a contact pattern connected to the cross key, the key top, the selection key, etc. On the inner side of the front surface also, there is provided a printed board provided with a contact pattern connected to each button key. These printed boards are electrically connected to each other, and further, connected to the game apparatus through by a cable through a connector. In some cases, no cable is used, wireless connection to the game apparatus being effected.

To operate this controller, the user holds both sides of the case with the palms of his right and left hands, applies his right thumb to the cross key (or the key top), his left thumb to the key top (or the cross key), and the right and left index fingers and middle fingers to the button keys, and appropriately operates these keys with his fingers in accordance with the progress of the game, thereby enjoying the game projected onto the display screen.

In a controller as described above, a multi-function system is realized to enhance, for example, the realism of the game during operation. For example, a vibrator (vibration generating device) is provided in the case, vibrating the controller and stimulating the sense of touch of the operator.

In many cases, there exists a means for vibrating the controller by combining a vibration with low frequency and high amplitude with a vibration with high frequency and low amplitude, thereby improving the operational sensation.

To obtain, for example, two or more kinds of vibration, a structure is available in which for example, inside a case, at least one vibration motor is provided on either side thereof.

Each of these motors is provided with an eccentric weight whose moment of inertia with respect to the rotating shaft differs, and the rotating shaft of each motor is rotated at a different speed to generate different vibrations.

However, in a construction in which two or more motors are provided as described above, it is necessary to provide wiring for a circuit board, a fastening member for transmitting the vibration of the motor to the case and fastening the motor the case, resulting in an increase in the number of parts. Further, an assembly cost for them is required, which is an obstacle to a reduction in cost.

Further, the specifications for the two or more motors, which generate different vibrating conditions, differ, and the specifications for the eccentric weights also differ, so that the number of parts increases, making it further difficult to achieve a reduction in cost.

Furthermore, in such a construction, a space for accommodating a motor is required, and the weight of the motors and eccentric weights make up a considerable proportion, so that it is difficult to achieve a reduction in the size and weight of the controller, and there is a possibility of the operability of the controller deteriorating.

Further, when the controller is provided with other functions to realize a multi-function system, the motor accommodating space makes up a large proportion in the volume of the controller, so that it is difficult to realize such a system.

SUMMARY OF THE INVENTION

The present invention has been made in view of the above problems. The present invention aims to achieve the following objectives.

(a) To achieve a reduction in the number of parts;

(b) To achieve a reduction in the size and weight of the controller;

(c) To achieve a reduction in the size and weight of the vibration generator;

(d) To achieve a reduction in production cost;

(e) To achieve a reduction in the kinds of parts;

(f) To facilitate the realization of a multi-function system; and (g) To improve the operability of the controller.

To achieve the above objects, there is provided, in accordance with the present invention, an input device (controller) for inputting signals to a game apparatus using a computer, the input device comprising a vibration generating means for imparting vibration to this input device, wherein the vibration condition of the vibration generating means can be set in accordance with the frequency.

In accordance with the present invention, there is provided a vibration generating means whose vibrating condition can be set in correspondence with the frequency, so that it is possible to generate two or more kinds of vibrating condition in correspondence with the frequency. Thus, there is no need to provide separate vibration generating means in correspondence with the vibrating conditions, whereby it is possible to achieve a reduction in the number of parts and a reduction in the size and weight of the controller (input device), and facilitate the realization of a multi-function system by accommodating constructions for other functions in the space in the controller, thereby improving the operability of the controller.

In the present invention, the vibration generating device (the vibration generating means) comprises a rotation shaft which is rotated, and an eccentric weight mounted to the rotation shaft such that the eccentric condition can be set in accordance with the speed (frequency) of the rotations shaft, and this eccentric weight comprises a stationary weight mounted to the rotation shaft with its eccentric state being fixed, and a movable weight whose eccentric position can move radially outward from the center of rotation and radially inward in correspondence with increase and decrease in the frequency, wherein the movable weight protrudes at an angle with respect to the rotation shaft outward from the center of rotation opposite to the eccentric direction of the stationary weight, and is connected to the forward end of a spring member whose angle with respect to the rotation shaft is variable.

In the vibration generating device (vibration generating means) of the present invention, when the rotation shaft is rotated vibration is generated since the stationary weight is eccentric. Further, when the speed (frequency) of the rotation shaft is increased, the spring member undergoes elastic deformation due to the centrifugal force applied to the movable weight, and the movable weight moves radially outward from the center or rotation; the eccentric conditions of the stationary weight and the movable weight cancel each other out, generating a vibration with low amplitude, whereby it is possible to generate two or more kinds of vibrating conditions in accordance with the frequencies, thereby realizing a multi-function system in the vibration generating device, achieving a reduction in the size and weight of the device, improving the operability of the device and achieving a reduction in production cost. Further, there is no need to provide separate vibration generating means in correspondence with the vibration conditions, whereby it is possible to reduce the number of parts, and achieve a reduction in the size and weight of the controller (input device); by accommodating a multi-function construction in the space in the controller, the realization of a multi-function system is facilitated, and the operability of the controller can be improved, making it possible to reduce the kinds of parts and achieve a reduction in production cost.

DESCRIPTION OF THE PREFERRED EMBODIMENT

A vibration generating device according to the present invention and an input device for a game apparatus using the same will now be described with reference to the drawings.

Figure 1:
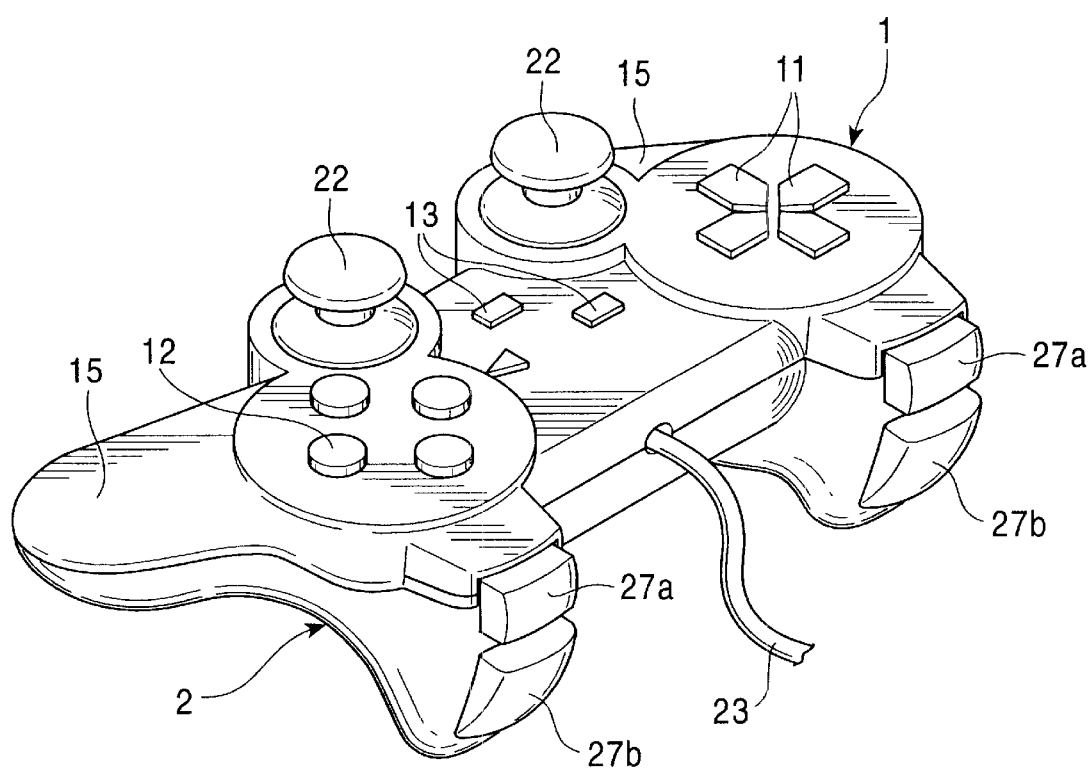
FIG. 1 is a perspective view of an input device for a game apparatus according to an embodiment of the present invention.
Figure 2:
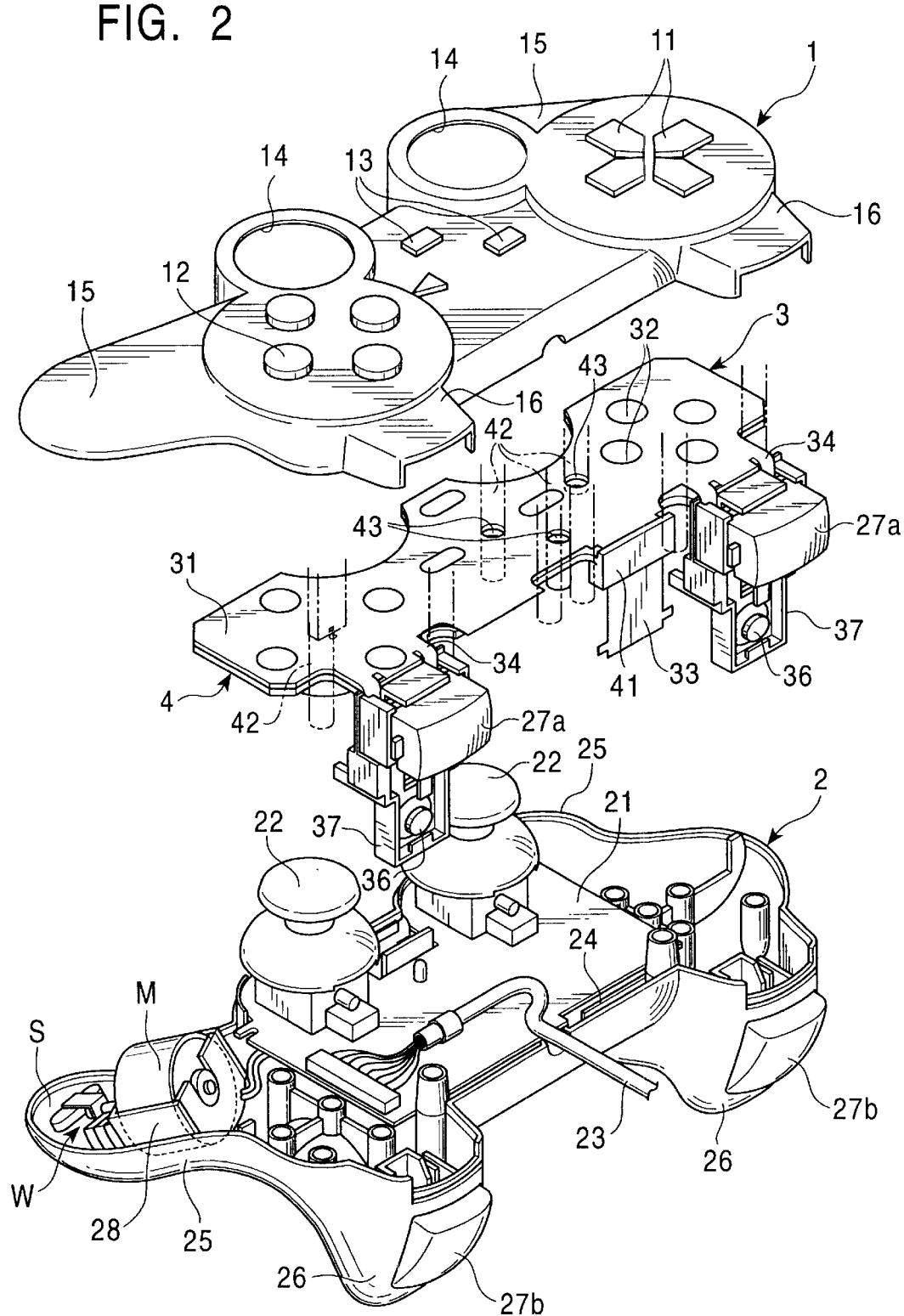
FIG. 2 is an exploded perspective view of an input device for a game apparatus according to an embodiment of the present invention.
Figure 3:
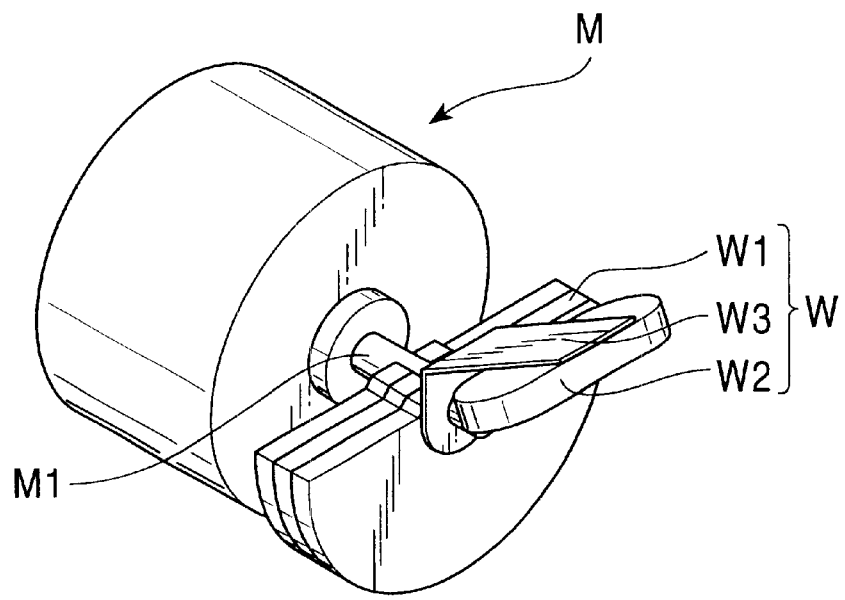
FIG. 3 is a perspective view of a vibration generating means in a vibration generating means (vibration generating means) according to an embodiment of the present invention.
Figure 4:
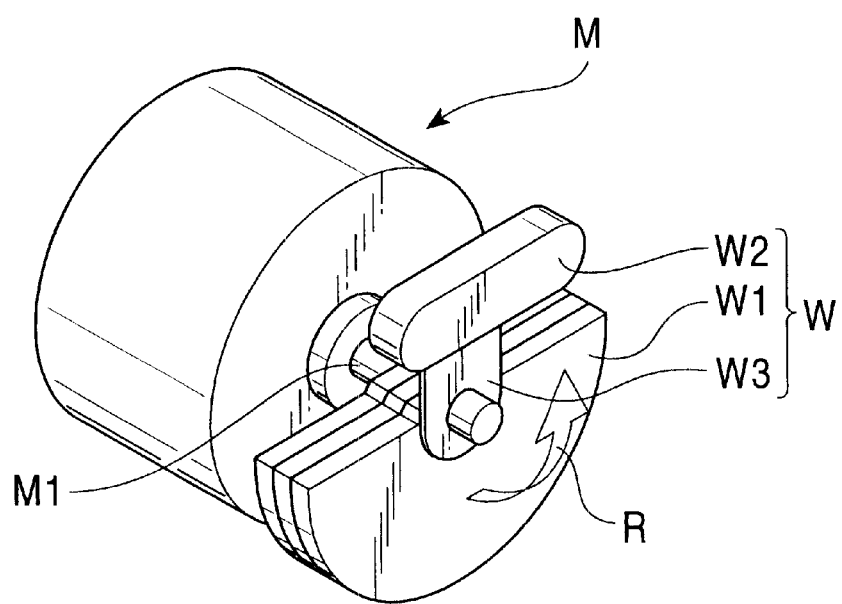
FIG. 4 is a perspective view of a vibration generating means in a vibration generating means (vibration generating means) according to an embodiment of the present invention.

FIG. 1 is a perspective view of a controller for a game apparatus according to an embodiment of the present invention, FIG. 2 is an exploded perspective view of the same, and FIGS. 3 and 4 are perspective views of a vibration generating device (vibration generating means) according to this embodiment.

In FIGS. 1 and 2, numeral 1 indicates an upper case (first case member) constituting the upper side of the casing portion of the controller, numeral 2 indicates a lower case (second case member) constituting the lower side of the casing portion, numeral 3 indicates a flexible board (flexible film-like board) accommodated in the inner space defined by the upper case 1 and the lower case 2, and numeral 4 indicates a plate (fastening member) for pressing the flexible board 3 against the inner surface of the upper case 1 and securing it thereto.

As shown in FIG. 1, on the upper side of the upper case 1, there are provided on one side a cross key (operating member) 11, on the other side a key top (operating member) 12 consisting of four kinds of keys, and selection keys (operating members) 13 in the middle. At the back side (operator side) end of the upper surface, there are formed holes 14 into which operating levers 22 described below are inserted and from which the head portions of the operating members protrude. On both sides of this case 1 and on the outer side of the holes 14, there are formed members 15 so as to protrude on the back side. At both ends of the front side (the side opposite to the operator) of the upper surface, there are formed protrusions 16 having a U-shaped cross-sectional configuration so as to protrude forward.

As shown in FIG. 2, in the lower case 2, a printed circuit board 21 is mounted, and on this printed circuit board 21, the operating levers 22 are arranged, a cable 23 for extracting signals from the printed circuit board 21 being connected to the printed circuit board 21. Further, a connector 24 is provided at the front side end of the printed circuit board 21. And, on both sides of the operating levers 22, there are formed half members 25 which protrude on the back side and which are connected to the above-mentioned members 15 to constitute hollow accommodating portions S, and at both ends of the front side of the lower case 2, there are formed protrusions 26 connected to the protrusions 16, button keys 27a and 27b being mounted to the protrusions 26.

One of the half members 25 accommodates at the inner position of the accommodating portion S a vibration motor M, which is connected to the printed circuit board 21 by wiring or the like. At the bottom surface of the member 25, there is provided a motor holder M, the vibration motor 28 being accommodated in the motor holder 28 and fastened thereto.

It is also possible to form the motor holder 28 integrally with the half member 25 by integral molding.

The motor M constitutes a vibration generating means (vibration generating device). As shown in FIGS. 2 through 4, the motor M has a rotation shaft M1 which is rotated, and an eccentric weight W mounted to the rotation shaft M1 such that the eccentric condition can be set according to the speed (frequency) of the rotation shaft M1.

As shown in FIGS. 3 and 4, this eccentric weight W has a stationary weight mounted to the rotation shaft M1 in a fixed eccentric state, and a movable weight W2 whose eccentric position can move radially from the center of rotation to the outside in response to an increase in the frequency and whose eccentric position can move radially from the center of rotation to the inside in response to a decrease in the frequency.

As shown in FIGS. 3 and 4, the stationary weight W1 consists of a plurality of semicircular iron plates connected together. The rotation shaft M1 is positioned at the center of the semicircle, and the stationary weight is secured in position so as to be parallel with a plane perpendicular to the rotation shaft M1, the center of gravity thereof being positioned on the outside of the rotation shaft M1.

As shown in FIGS. 3 and 4, the movable weight W2 is connected to the forward end of a spring member protruding from the center of rotation in a direction opposite to the eccentric direction of the stationary weight W1 at an angle with respect to the rotation shaft M1, which angle is variable due to its elastic deformation. The eccentric state of this movable weight W2 is set such that, with the rotation shaft M1 not rotating, the distance between the center of gravity thereof and the rotation shaft M1 is smaller than the distance between the center of gravity of the stationary weight W1 and the rotation shaft M1, and the weight of the stationary weight W1 is smaller than the weight of the movable weight W2. That is, the eccentric state of the movable weight W2 is set such that its moment of inertia around the rotation shaft M1 is smaller than that of the stationary weight W1.

The spring member W3 is a plate spring, which is not substantially deformed in the circumferential direction of the stationary weight W1 by the rotation of the rotation shaft M1, the strength, width, thickness, etc. of the plate spring being set such that it can be deformed by the centrifugal force applied to the movable weight W2 along a plane passing the rotation shaft M1 and including the center of gravity of the stationary weight W1.

In the vibration generating means (vibration generating device) of this embodiment, when the rotation shaft M1 is rotated with the motor M being set to a low frequency (speed), the position of the movable weight W2 with respect to the rotation shaft M1 does not change as shown in FIG. 3, as in the state in which the rotation shaft M1 does not rotate. Due to the eccentricity of the stationary weight W1, vibration is generated. Since the distance between the center of gravity of the stationary weight W1 and the rotation shaft M1 is set to be smaller than the distance between the center of gravity of the movable weight W2 and the rotation shaft M1, the positional eccentricity of the center of gravity of the eccentric weight W as a whole is large. Thus, a vibration with high amplitude is generated, whereby it is possible to vibrate the controller at low frequency and high amplitude through the motor holder 28. This vibration is transmitted to the operator playing the game, etc., whereby the sense of touch of the operator can be stimulated, making it possible to improve the reality of the game, etc.

Further, when the speed (frequency) of the rotation shaft M1 is increased, the centrifugal force applied to the movable weight W2 increases, and, as indicated by the arrow R in FIG. 4, the spring member W3 undergoes elastic deformation due to this centrifugal force, the movable weight W2 moving radially outward from the rotation shaft M1, which is the center of rotation. Then, the eccentric states of the stationary weight W1 and the movable weight W2 cancel each other, the positional eccentricity of the eccentric weight W as a whole decreases, with the result that a vibration with low amplitude is generated, whereby it is possible to vibrate the controller at high frequency and small amplitude through the motor holder 28. This vibration is transmitted to the operator performing a game or the like, whereby it is possible to stimulate his sense of touch, making it possible to improve the reality, etc. of the game or the like.

Further, when the speed (frequency) of the rotation shaft M1 is reduced, the centrifugal force applied to the movable weight W2 decreases, as shown in FIG. 3, and, due to this decrease in centrifugal force, the spring member W3 undergoes elastic deformation, and the movable weight W2 moves radially inward from the rotation shaft M1, which is the center of rotation, making it possible to vibrate the controller at low frequency and large amplitude.

As described above, it is possible to generate two or more kinds of vibration states with a single motor M in accordance with the frequency, and this vibration is transmitted to the operator, whereby it is possible to impart two or more kinds of stimulation to his sense of touch, making it possible to improve the reality, etc. of the game or the like. Further, it is possible to create a multi-function system in the vibration generating device, achieve a reduction in the size and weight of the device, improve the operability of the device, and achieve a reduction in production cost. At the same time, there is no need to provide separate vibration generating means in correspondence with the vibration states, whereby the number of parts can be reduced and a reduction in the size and weight of the controller (input device) can be achieved. Further, by accommodating a construction for other functions in the empty space in the controller such as the accommodating portion S, thereby facilitating the realization of a multi-function system, improving the operability of the controller, and reducing the number of parts to further reduce the production cost.

A predetermined wiring pattern is formed on the flexible board 3. As shown in FIG. 2, at positions on the upper surface of the board main body 31 corresponding to the cross keys 11, the key tops 12 and the selection keys 13 on the upper surface of the upper case 1, there are formed contact patterns 32 for effecting ON/OFF operation in response to the operation of these keys 11 through 13. And, substantially the central portion of the front side of the board may body 31 extends forward to form tape wiring 33 connected to the connector 24, and the end portions corresponding to the protrusions 16 extend forward to form tape contacts 34. On these tape contacts 34, there are placed rubber contacts 36 having two contacts, and these rubber contacts 36 are fitted into the holders (support members) 37 with the tape contacts 34 and fastened therein, button keys 27a and 27b being fitted into these holders 37 so as to come into contact with the contacts on the board main body 31 side of the rubber contacts 36 to make it possible to effect ON/OFF operation.

On the other hand, the tape wiring 33 is inserted into the slit of the wall portion 41 for preventing static electricity provided at the end on the front side of the plate 4 to be thereby vertically supported, and the forward end portion is inserted into the connector 24 of the lower case 2 to be thereby electrically connected. This wall portion 41 is positioned at the connecting portion of the upper case 1 and the lower case 2 to thereby prevent static electricity from outside, preventing the influence of static electricity on the tape wiring 33.

And, in the board main body 31 and the plate 4, there are formed holes 43, into which positioning pins (protrusions) 42 provided on the upper case 1 are inserted.

To assemble this controller, the printed board 21 is first fitted into the lower case 2 at a predetermined position, and the cable 23 is drawn to the outside, and, at the same time, the motor M is accommodated in the motor holder 28.

Next, the rubber contacts 36 are placed on the tape contacts 34 of the flexible board 3, and are fitted into the holders 37, and the button keys 27a are fitted into the holders 37. After this, the button keys 27a are inserted into the lower holes of the lower case 2, and the tape wiring 33 is inserted into the slit of the support plate 41 to bring the plate 4 into close contact with the board main body 31, causing the tape wiring 33 to protrude. Then, the positioning pins 42 of the upper case 1 are inserted into the holes 43 of the board main body 31 and the plate 4, the flexible board 3 is pressed against the inner surface of the upper case 1 by the plate 4, and the upper case 1 is fitted into the lower case 2, with the flexible board 3 and the plate 4 being accommodated therein, to form an integral unit to thereby assemble the controller.

In this controller, by operating each of the cross keys 11, the key tops 12, the selection keys 13, and the button keys 27a and 27b, a signal corresponding to the operation is input to the computer game apparatus through the flexible board 3, the tape wiring 3, the printed board 21 and the cable 23, and, by a signal or the like from the computer game apparatus, the rotation of the motor M is controlled to set the vibration state.

As described above, in the controller (input device) of this embodiment, constructed as described above, it is possible to selectively vibrate the controller at low frequency and large amplitude through the motor holder 28, and to vibrate it at high frequency and small amplitude, and the vibration is transmitted to the operator playing a game or the like, whereby it is possible to stimulate the sense of touch of the operator, thereby improving the realism, etc. of the game or the like.

Further, since only one motor M is used, it is possible to reduce the portion coming into electrical contact with the printed board as compared to the conventional device, thereby making it possible to achieve an improvement in terms of reliability.

Further, as described above, it is possible to generate two or more kinds of vibration states in accordance with the frequency by a single motor M, whereby there is no need to provide separate vibration generating means in correspondence with the vibration states, thereby reducing the number of parts and achieving a reduction in the size and weight of the controller (input device), and, by accommodating a construction for other functions in the empty space in the controller such as the accommodating portion S, it is possible to facilitate the creation of a multi-function system, whereby it is possible to improve the operability of the controller, and it is possible to reduce the kinds of parts, thereby further achieving a reduction in production cost.

The movable weight W2 and the spring member W3 are provided such that the moment of inertia with respect to the rotation shaft M1 varies in accordance with the speed of the rotation shaft M1, and the mounting state of the movable weight W2 and the spring member W3 with respect to the position of the center of gravity of the stationary weight W1, the relationship in weight between the movable weight W2 and the stationary weight W1, and the number and configuration of the movable weight W2, the stationary W1 and the spring member W3 can be appropriately selected.

The vibration generating device and the game apparatus input device using the same provide the following advantages.

(1) There is provided a vibration generating means imparting a vibration to the controller, and the vibration state of this vibration generating means can be set in correspondence with the frequency, whereby there is provided a vibration generating means whose vibration state can be set in correspondence with the frequency, thereby making it possible to generate two or more kinds of vibration states in correspondence with the frequency. Thus, there is no need to provide separate vibration generating means in correspondence with different vibration states, whereby it is possible to reduce the number of parts and achieve a reduction in the size and weight of the controller (input device), and, by accommodating a structure for other functions in the space in the controller, it is possible to facilitate the realization of a multi-function system, thereby improving the operability of the controller.

(2) The vibration generating device (vibration generating means) has a rotation shaft to be rotated, and an eccentric weight mounted to the rotation shaft such that the eccentric state can be set in accordance with the speed (frequency) of the rotation shaft, and the eccentric weight has a stationary weight has a stationary weight mounted to the rotation shaft with its eccentric state being fixed with respect to the rotation shaft, and a movable weight whose eccentric position can move radially outward and inward from the center of rotation; the movable weight protrudes outward from the center of rotation in a direction opposite to the eccentric direction of the stationary weight at an angle with respect to the rotation shaft, and is connected to the forward end of a spring member whose angle with respect to the rotation shaft is variable, whereby it is possible to form the eccentric weight in a simple structure; when the rotation shaft is rotated, a vibration is generated due to the eccentricity of the stationary weight, and when the speed (frequency) of the rotation shaft is increased, the spring member undergoes elastic deformation due to the centrifugal force applied to the movable weight, and the movable weight moves radially outward from the center of rotation, and the eccentric states of the stationary weight and the movable weight cancel each other to generate a vibration at small amplitude, whereby it is possible to generate two or more kinds of vibration states, thereby realizing a multi-function system in the vibration generating device, achieving a reduction in the size and weight of the device, improving the operability of the device, and achieving a reduction in production cost. Further, there is no need to provide separate vibration generating means in correspondence with different vibration states, whereby it is possible to reduce the number of parts and to achieve a reduction in the size and weight of the controller (input device); by accommodating a structure for other functions in the space in the controller, it is possible to facilitate the realization of a multi-function system, to improve the operability of the controller, and reduce the kinds of parts, thereby achieving a further reduction in production cost.

What is claimed is:

1. A vibration generating device, comprising:

a rotation shaft to be rotated about a center of rotation;

a stationary weight mounted to the rotation shaft so that an eccentric state and direction thereof is fixed; and a movable weight mounted to the rotation shaft so that an eccentric position thereof moves radially outward and inward from said center of rotation in correspondence with a respective increase and decrease in the speed of rotation of the rotation shaft, wherein the movable weight protrudes outward from the center of rotation at an angle to the rotation shaft in a direction opposite from an eccentric direction of the stationary weight, and is connected to a forward end of a plate spring member whose angle with respect to the rotation shaft varies with elastic deformation, and wherein the weight of the movable weight is smaller than the weight of the stationary weight, and an eccentric state of the movable weight is set such that its moment of inertia around the rotation shaft is smaller than that of the stationary weight.

2. An input device for a game apparatus to input signals to the game apparatus, the input device having vibration generating means whose vibration state is set in correspondence with a frequency of vibration, wherein the vibration generating means comprises:

a rotation shaft to be rotated about a center of rotation;

a stationary weight mounted to the rotation shaft so that an eccentric state and direction thereof is fixed; and a movable weight mounted to the rotation shaft so that an eccentric position thereof moves radially outward and inward from said center of rotation in correspondence with a respective increase and decrease in the speed of rotation of the rotation shaft, wherein the movable weight protrudes outward from the center of rotation at an angle to the rotation shaft in a direction opposite from an eccentric direction of the stationary weight, and is connected to a forward end of a plate spring member whose angle with respect to the rotation shaft varies with elastic deformation, and wherein the weight of the movable weight is smaller than the weight of the stationary weight, and an eccentric state of the movable weight is set such that its moment of inertia around the rotation shaft is smaller than that of the stationary weight.

* * * * *

UNITED STATES PATENT AND TRADEMARK OFFICE
CERTIFICATE OF CORRECTION

PATENT NO.      : 6,585,595 B1                                Page 1 of 1
DATED           : July 1, 2003
INVENTOR(S)     : Masahiro Soma It is certified that error appears in the above-identified patent and that said Letters Patent is hereby corrected as shown below:

<u>Title page,</u>
Item [56], References Cited, U.S. PATENT DOCUMENTS, delete "11/1958" and substitute -- 9/1955 -- in its place.

Signed and Sealed this

Twenty-third Day of December, 2003

JAMES E. ROGAN
*Director of the United States Patent and Trademark Office*